US007932912B1

(12) United States Patent
Van Dyke

(10) Patent No.: US 7,932,912 B1
(45) Date of Patent: Apr. 26, 2011

(54) FRAME BUFFER TAG ADDRESSING FOR PARTITIONED GRAPHICS MEMORY SUPPORTING NON-POWER OF TWO NUMBER OF MEMORY ELEMENTS

(75) Inventor: James M. Van Dyke, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 858 days.

(21) Appl. No.: 11/556,148

(22) Filed: Nov. 2, 2006

Related U.S. Application Data

(63) Continuation-in-part of application No. 11/538,741, filed on Oct. 4, 2006.

(51) Int. Cl.
*G06F 12/02* (2006.01)
*G06F 12/10* (2006.01)
*G06T 9/00* (2006.01)
(52) U.S. Cl. .................. 345/544; 345/568; 345/555
(58) Field of Classification Search .............. 345/544, 345/568, 566, 564, 536, 530, 501, 555
See application file for complete search history.

(56) References Cited

U.S. PATENT DOCUMENTS

| 5,129,060 | A | | 7/1992 | Pfeiffer et al. |
| 5,321,809 | A | | 6/1994 | Aranda |
| 5,384,912 | A | | 1/1995 | Ogrinc et al. |
| 5,696,927 | A | * | 12/1997 | MacDonald et al. ......... 711/207 |
| 5,781,200 | A | * | 7/1998 | Lu et al. ........................ 345/568 |
| 5,790,130 | A | | 8/1998 | Gannett |
| 6,006,318 | A | | 12/1999 | Hansen et al. |
| 6,070,227 | A | | 5/2000 | Rokicki |
| 6,092,124 | A | * | 7/2000 | Priem et al. ..................... 710/23 |
| 6,301,649 | B1 | | 10/2001 | Takasugi |
| 6,344,852 | B1 | | 2/2002 | Zhu et al. |
| 6,381,668 | B1 | * | 4/2002 | Lunteren ........................... 711/5 |
| 6,405,286 | B2 | | 6/2002 | Gupta et al. |
| 6,523,104 | B2 | | 2/2003 | Kissell |
| 6,661,423 | B2 | | 12/2003 | Lavelle et al. |
| 6,825,847 | B1 | * | 11/2004 | Molnar et al. ................ 345/555 |
| 6,853,382 | B1 | | 2/2005 | Van Dyke et al. |
| 6,999,088 | B1 | | 2/2006 | Van Dyke et al. |
| 7,286,134 | B1 | | 10/2007 | Van Dyke et al. |
| 7,620,793 | B1 | | 11/2009 | Edmondson et al. |
| 2003/0046501 | A1 | | 3/2003 | Schulz et al. |
| 2004/0080512 | A1 | | 4/2004 | McCormack et al. |
| 2004/0093457 | A1 | | 5/2004 | Heap |
| 2007/0126756 | A1 | | 6/2007 | Glasco et al. |

* cited by examiner

*Primary Examiner* — Joni Hsu
(74) *Attorney, Agent, or Firm* — Cooley LLP

(57) ABSTRACT

A graphics system has virtual memory and a partitioned graphics memory that supports having an non-power of two number of dynamic random access memories (DRAMs). The graphics system utilizes page table entries to support addressing Tag RAMs used to store tag bits indicative of a compression status.

22 Claims, 14 Drawing Sheets

| 0 | 0 | 0 | 0 | 0 | 0 | 0 | 0 |
|---|---|---|---|---|---|---|---|
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |

*FIG. 11*

| 0 | 2 | 1 | 3 | 0 | 2 | 1 | 3 |
|---|---|---|---|---|---|---|---|
| 1 | 3 | 2 | 0 | 1 | 3 | 2 | 0 |
| 2 | 0 | 3 | 1 | 2 | 0 | 3 | 1 |
| 3 | 1 | 0 | 2 | 3 | 1 | 0 | 2 |
| 0 | 2 | 1 | 3 | 0 | 2 | 1 | 3 |
| 1 | 3 | 2 | 0 | 1 | 3 | 2 | 0 |
| 2 | 0 | 3 | 1 | 2 | 0 | 3 | 1 |
| 3 | 1 | 0 | 2 | 3 | 1 | 0 | 2 |

*FIG. 12*

FRAME BUFFER TAG ADDRESSING FOR PARTITIONED GRAPHICS MEMORY SUPPORTING NON-POWER OF TWO NUMBER OF MEMORY ELEMENTS

CROSS-REFERENCE TO RELATED APPLICATIONS

This application is a continuation-in-part of U.S. patent application Ser. No. 11/538,741, filed on Oct. 4, 2006.

FIELD OF THE INVENTION

The present invention is generally related to partitioned memories. More particularly, the present invention is directed towards partitioned graphics memories.

BACKGROUND OF THE INVENTION

There is increasing interest in graphics systems that utilize a partitioned graphics memory. Background information on partitioned graphics memories is described in U.S. Pat. No. 6,853,382 by Van Dyke et al., the contents of which are hereby incorporated by reference. A partitioned graphics memory has a number of partitions that are each operative to independently service memory requests from a plurality of memory clients while maintaining the appearance to a nave memory client of a unitary memory system.

A partitioned graphics memory provides several advantages. One advantage is that since conventional dynamic random access memories (DRAMs) come in a limited number of standard sizes, a partitioned graphics memory allows an increase in the effective memory size, which improves performance.

As one example of a partitioned graphics memory, FIG. 1 illustrates a memory system 100 similar to that described in U.S. pat. Ser. No. 10/740,229 by Van Dyke et al., the contents of which are hereby incorporated by reference. A memory system 100 for a partitioned memory. system 100 includes two or more memory partitions, with the total number of partitions being equal to a power of two, such as four partitions. Each partition P0 115, P1 120, P2 125, and P3 130 is coupled to a memory controller 105 by its own respective data bus 135. Each data bus 135 has a memory byte width. $W_p$, with an associated packet width for addressing locations within the partition. In accord with a common usage in the graphics industry, a packet is a unit of data transfer.

In turn, each partition may have sub-partitions, such as two sub-partitions SP0 140A and SP1 140B. Each sub-partition 140A and 140B has its own respective sub-bus 148 with a corresponding byte width for sub-packets, $W_{sp}$, addressed to a memory location in the sub-partition. Thus, in a single memory access to a partition, Pi, a single memory access may be made to each of its sub-partitions SPi. The sub-partitions are thus the minimum addressable unit of the graphics system. Each sub-partition may, for example, be a double data rate (DDR) dynamic random access memory (DRAM). As an illustrative example, each partition may have 64 data pins whereas each sub-partition 140A or 140B has 32 data pins. This permits, for example, a 64 bit partition to be implemented as two conventional 32 bit memory chips.

The memory controller 105 routes addresses of requests from individual clients of a graphics system to specific partition/sub-partition memory locations. The individual clients may be any component within a graphics processing system that requires access to a graphics memory to read, write, clear, or compress tile data. An arbitration module 150 selects a client 155 or 160.

A partition address routing module 190 maps an address associated with a client (e.g., a read or write request) to a memory location in a partition and its associated sub-partitions. A compression/decompression module 165 is included to compress and decompress tile data to reduce memory bandwidth requirements. A tag module 170 may be included to identify, by a tag (e.g., one or more bits) attributes of the tiles, such as whether a tile holds data in a compressed format. A packing/unpacking state machine 180 and format conversion module 195 are provided to reorganize tile data.

As previously described, partitioning permits the total effective number of DRAM data pins to be increased compared to an individual DRAM. The total effective number of data pins for the partitioned graphics memory is the number of data pins per partition multiplied by the number of partitions, As graphics systems have evolved, the equivalent DRAM memory size of partitioned graphics memories have increased from 128 pins ($2^7$) to 256 pins ($2^8$) in current generation products. For example. a total DRAM address space corresponding to 256 pins (which is a power of two, i.e., $256=2^8$) may be implemented with four partitions each having 64 DRAM pins.

Conventionally, the number of DRAMs in a partitioned graphics memory is a power of two As is well known, binary address spaces naturally scale as a power of two. Additionally, many other attributes of a computer system also typically scale as a power of two. As a consequence, conventional partitioned graphics memories utilize a power of two number of partitions (e.g., four) and have a power of two number of DRAMs (e.g., eight DRAMs in a partitioned graphics memory having four partitions and two DRAMs per partition).

However, doubling the number of DRAMs in successive product generations increases costs and also tends to reduce yield due to the larger chip area that is required. Consequently, it would be desirable to support an arbitrary number of partitions.

In light of the above-described problems the apparatus, system and method of the present invention was developed.

SUMMARY OF THE INVENTION

A graphics system includes a partitioned graphics memory and utilizes a virtual memory and page table entries for performing address mapping to tag RAMs. The page table entries support the use of a non-power of two number of partitions.

One embodiment of a graphics system includes a partitioned tiled graphics memory having a plurality of partitions each including at least one dynamic random access memory (DRAM). The graphics system includes a graphics processing unit including an address translation module to translate virtual addresses into physical addresses. The address translation module is operative to map a physical memory address to a partition number. A tag RAM is assigned to each partition to store compression tags indicative of a compression status associated with tiles stored in the partitioned graphics memory. The graphics system includes a virtual memory in which page table entries are used to store information for mapping page table entries to tag RAM addresses including a bit aligned starting offset address of memory pages in a software representation of tag address space. The page table entries support both a power-of-two and a non-power of two number of partitions.

BRIEF DESCRIPTION OF THE FIGURES

The invention is more fully appreciated in connection with the following detailed description taken in conjunction with the accompanying drawings, in which:

FIG. 11 illustrates an exemplary gob partition assignment without swizzling in accordance with one embodiment of the present invention;

FIG. 12 illustrates an exemplary gob partition assignment with swizzling in accordance with one embodiment of the present invention;

Like reference numerals refer to corresponding parts throughout he several views of the drawings.

DETAILED DESCRIPTION OF THE INVENTION

Figure 1:
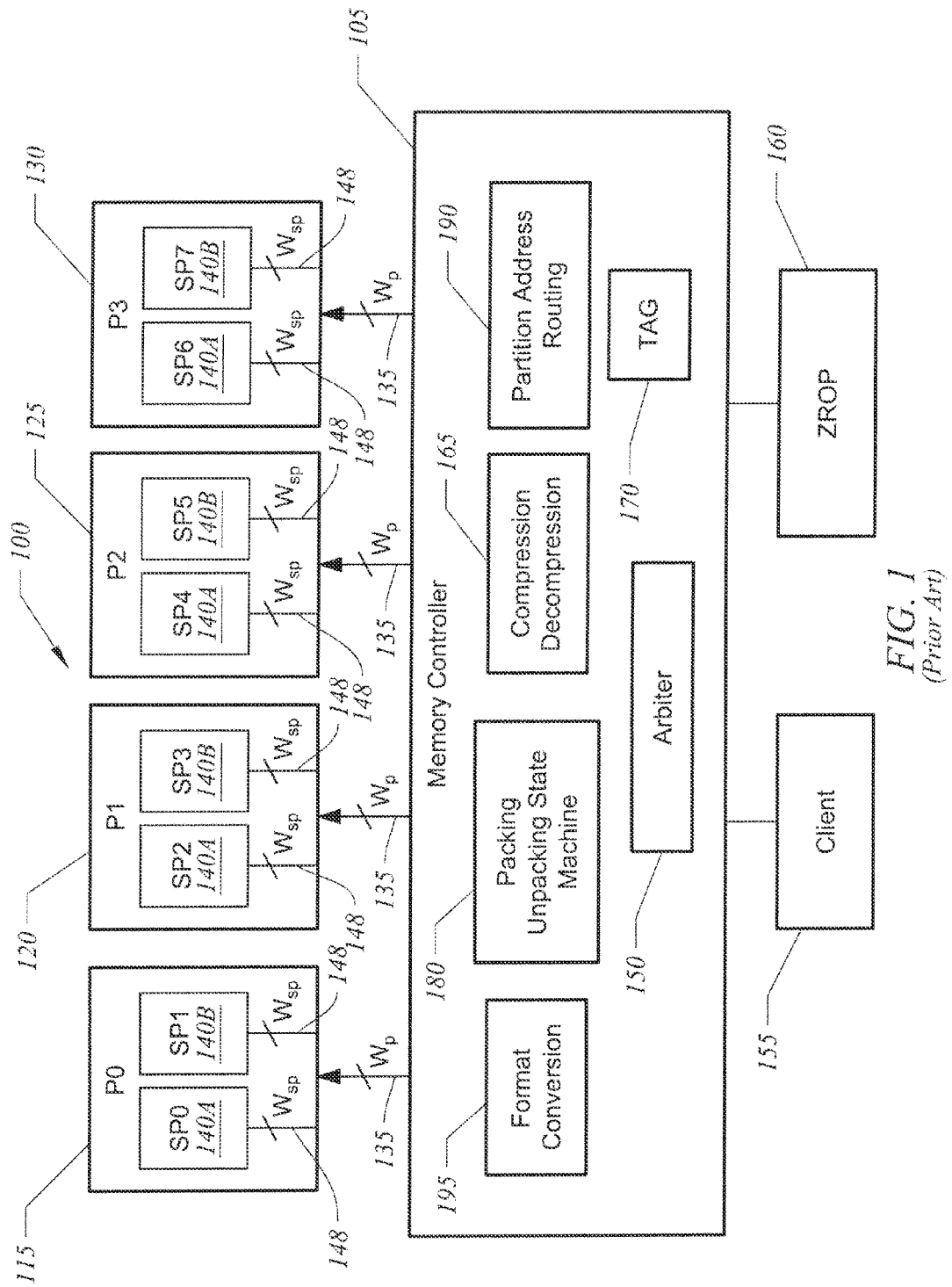
FIG. 1 is a block diagram of a prior art partitioned graphics memory.
Figure 2:
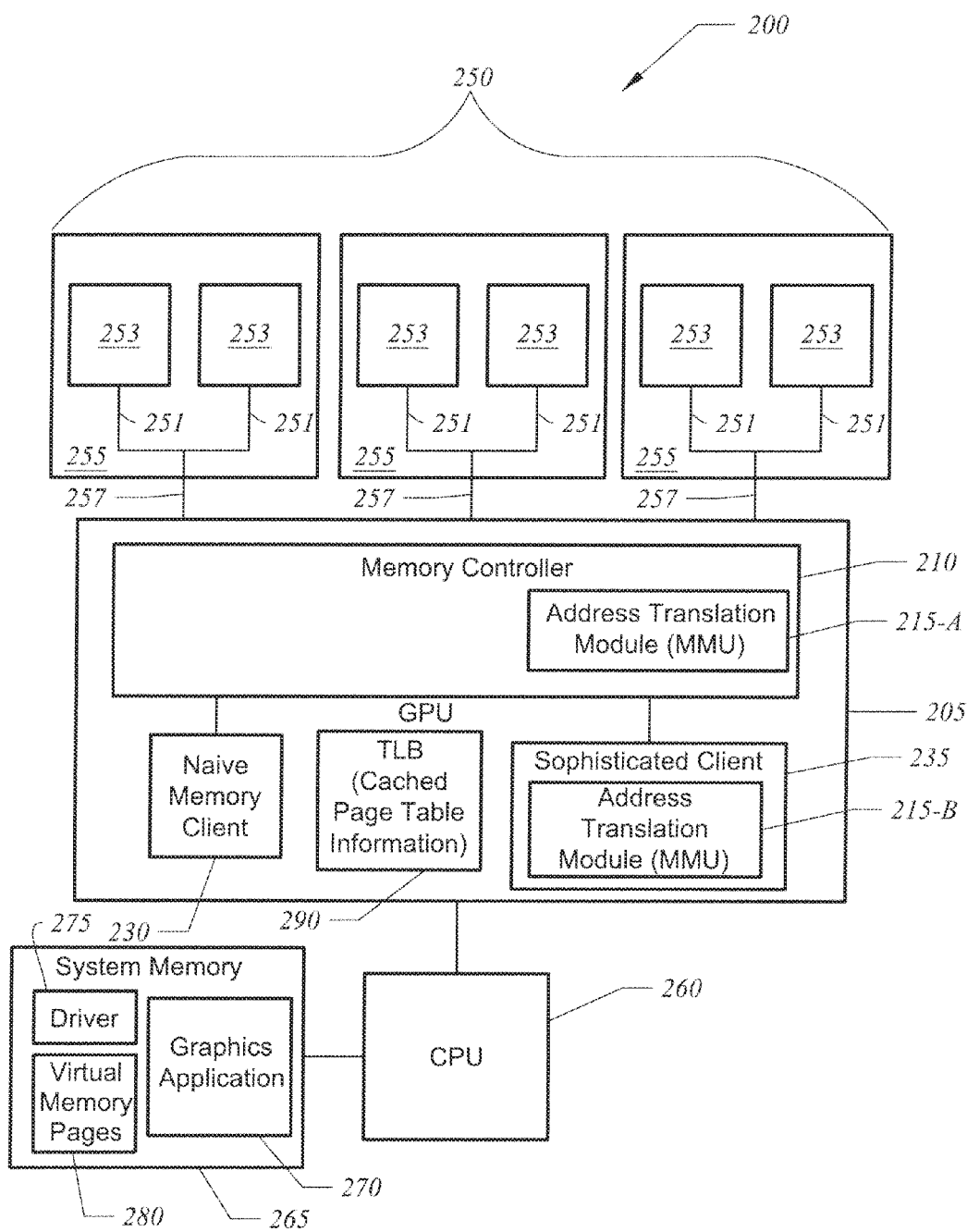
FIG. 2 is a block diagram of a graphics system with a partitioned graphics memory having a non power of two number of partitions according to one embodiment of the present invention.

FIG. 2 illustrates a graphics system 200 in accordance with one embodiment of the present invention. A graphics processing unit 205 includes a memory controller 210 to interface a partitioned graphics memory 250 having memory partitions 255 coupled by respective buses 257 to memory controller 210. Each partition 255, may for example, further include sub-partitions 253 coupled to sub-buses 251 via respective parallel interfaces. Each sub-partition 253 includes a memory element. For example, each sub-partition 253 may include a memory element that is a dynamic random access memory (DRAM). Although DRAM is an exemplary type of memory element, it will be understood throughout the following discussion that it is contemplated that the present invention may be applied to other types of memories. Each DRAM of a sub-partition 253 has parallel interfaces with respect to the other sub-partitions 253 of the same partition 255 such that the total equivalent number of DRAM data pins of each partition 255 scales with the number of sub-partitions 253. For example, a single partition 255 having two sub-partitions 253 each of which are 32 bit DRAMs results in an equivalent 64 bit access word.

Memory controller 210 is capable of interfacing a partitioned memory with a non-power of two number of DRAMs (i.e., the number of operative DRAM memory elements does not equal $2^m$, where m is an integer). FIG. 2 illustrates an embodiment with a non-power of two number of partitions (e.g., three partitions with two sub-partitions in each partition) such that the total number of DRAMs is not a power of two. In an alternate embodiment illustrated in FIG. 3, each partition includes a non-power of two number of sub-partitions 253 (e.g., three DRAMs) such that the total number of DRAMs is not equal to a power of two.

In one embodiment memory controller 210 is programmable such that it is capable of supporting different numbers of DRAMs, including both a power of two number of DRAMs and a non-power of two number of DRAMs. As one example, memory controller 210 may be designed to support different numbers of partitions (e.g., 1, 2, 3, 4, 5, 6, 7, or 8 partitions) and during assembly programmed to support a particular number of partitions. For example, a non-volatile memory may be written to indicate the number of partitions. The number of partitions may be selected, for example, based on cost constraints or yield considerations. For example, the number of partitions selected as operative (active) partitions may be reduced from a maximum number to account for a manufacturing defect. As one example of a yield consideration, one reason that a non-power of two number of partitions may be used is the case where a chip is nominally designed for four partitions but after manufacture has one defective partition. In this example instead of discarding the die, the defective partition can be disabled and a product with three (a non power-of-two) active partitions shipped. In a performance mode the number of partitions may be selected for different market segments. Similarly, the number of sub-partitions per partition may be based on cost or yield considerations.

Memory controller 210 includes an address translation module 215-A to map memory addresses to particular partitions and row-bank-column addresses within partitions. Memory controller 210 performs address translation on behalf of nave memory clients 230 that lack an address translation capability. However, it will be understood that a sophisticated memory client 235 may include an address translation module 215-B that performs some or all of the address translation for the sophisticated client.

In one embodiment, graphics system 200 includes a CPU 260 utilizing virtual memory addressing implemented using virtual memory pages 280, paging, page tables, and page table entries (PTEs). A system memory 265 stores a graphics application 270, driver 275, and a page table 280. Virtual memory pages 280 are used for memory management and may, for example, be generated to store data for a graphics surface drawn by graphics application 270. A virtual memory page corresponds to a range of consecutive addresses in a virtual address space, such as a 4 KB page size or a 64 KB page size. Address translation information to map virtual to physical page numbers are stored in page tables associated with individual pages. Individual items in a page table are known as page table entries (PTEs). Examples of a graphics system which utilizes page table entries to provide information on tile storage formats for address translation in a partitioned graphics memory is described in U.S. pat. Ser. No. 11/393,621, "Apparatus, System, and Method for Using Page Table Entries in a Graphics System to Provide Storage Format Information For Address Translation," by Montrym et al., the contents of which are hereby incorporated by reference.

Figure 3:
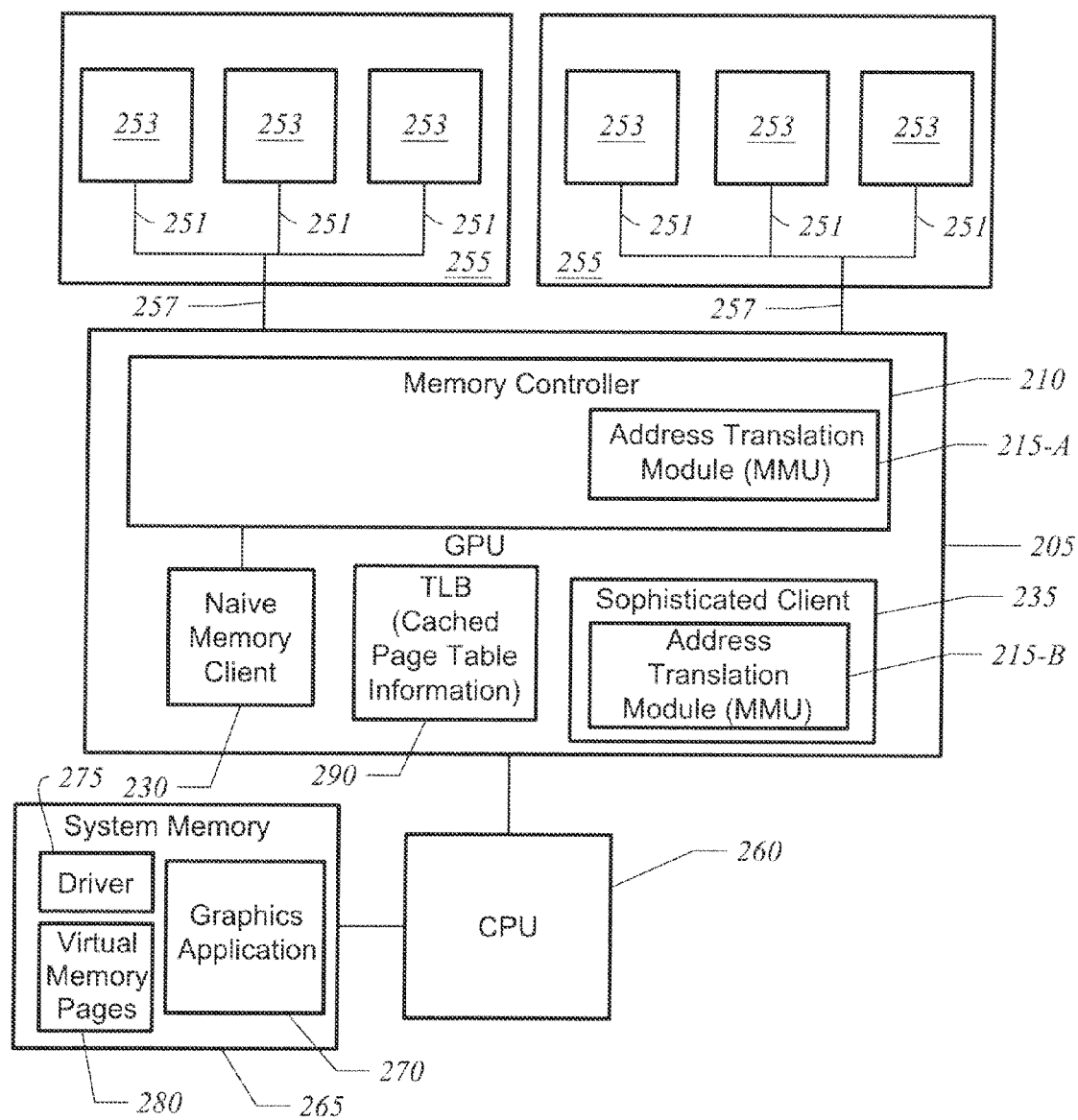
FIG. 3 is a block diagram of a graphics system with a partitioned graphics memory having a non-power of two number of DRAMs per partition according to one embodiment of the present invention.

In one embodiment, memory management unit (MMU) logic is used to handle memory access requests and perform address translation from virtual addresses to physical addresses. The virtual address space is divided into pages. Copies of the MMU logic may reside in different locations within the graphics system, depending on the implementation. As illustrated in FIGS. 2 and 3, a copy of the MMU logic may be included in address translation module 215-A. A translation lookaside buffer (TLB) 290 in GPU 205 may be used to cache address translation information to translate virtual page numbers to physical page numbers. Page table entries stored in page tables provide additional information for translating addresses. In particular, in a partitioned graphics memory using DRAMs as the memory elements the physical addresses further need to be translated into partition numbers and the row-column-bank addresses within individual DRAMs.

Figure 4:
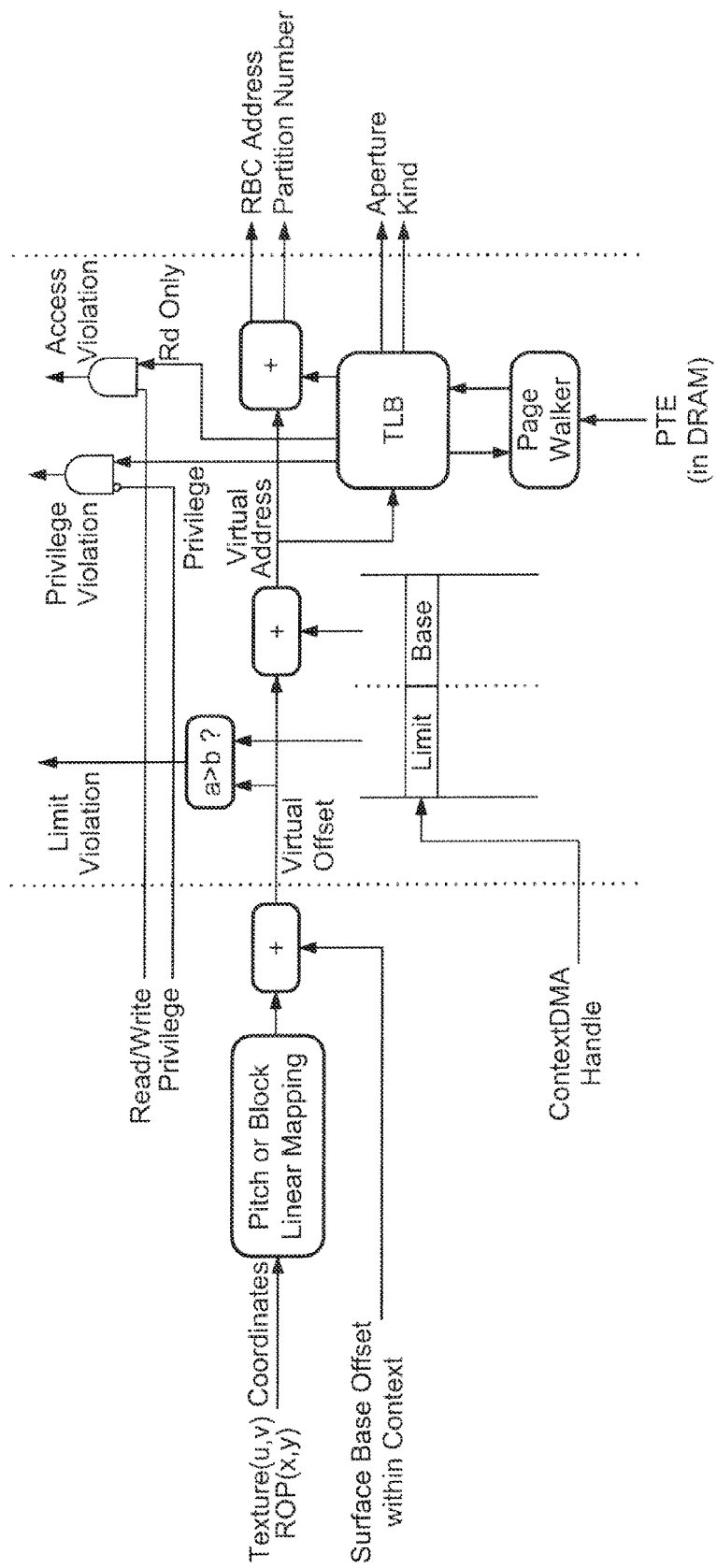
FIG. 4 illustrates a memory management unit (MMU) process for determining partition number and DRAM row-column-bank addresses according to one embodiment of the present invention.

FIG. 4 illustrates an exemplary MMU process. The MMU maps input graphics coordinates, such as texture (u,v) coordinates or (x,y) surface coordinates to virtual addresses. In one embodiment a virtual memory page can be considered to be a virtual tile, where a virtual tile describes a region of virtual memory with common properties that maps to a contiguous region of physical memory. The virtual address space is divided into virtual tiles which can be either a power of two in size (e.g., 64 KB) or a graphics non-power of two size, depending on the number of DRAMs. The MMU maps the virtual tile address to the location of the virtual tile in physical memory using page table entries.

Depending on a client, a virtual address is computed by applying a mapping (such as a pitch or block-linear mapping) onto the coordinates of the surface mapped. A virtual address is determined based, for example, on a virtual offset. A TLB receives PTE information from virtual memory pages. The MMU maps the virtual tile address bits from the virtual address to the location of the virtual tile in physical memory using the PTEs. The PTEs provide information on the "Kind" of data that is stored, and may include information on the data storage formats. Additionally, in one embodiment the PTEs provide information used to generate a partition number and a row-bank-column (RBC) address, such as partition stride, partition swizzle, partition offset or bank swizzle. As described below in more detail, PTE "Kind" fields may also be used to store information related to compression options. To map virtual addresses to physical addresses, the low order bits of the virtual address may be used as low order bits of the physical address. High order bits of the virtual address may be used as keys into address translation tables to determine the higher order bits of the physical address.

In one embodiment, the MMU maps the virtual tile address bits from the virtual address to the location of the virtual tile in memory using the PTEs. The remainder of the bits from the virtual address are then combined with the address of the virtual tile in physical memory to compute the physical address associated with the virtual address requested. As an illustrative example, in one embodiment of a 64 KB virtual tile, bits [7,0] specify the byte within a 256 B physical region, bits [15:8] specify a 256 B physical region within the 64 KB virtual tile, and bits [39:16] specify the virtual tile address.

In one embodiment, the MMU logic utilizes one or more modulo operations to perform a partition assignment. A modulo operation is an operation in which for two integers a and n, the operation a modulo n, the result is the remainder after division of a by n. The modulo operation is often represented by the character. A modulo operation may be used to "cycle" physical memory addresses assigned to a partition number or a sub-partition number. That is, one or more modulo operations may be performed on appropriately scaled sets of physical memory addresses to assign chunks of physical memory address to partitions or sub-partitions in a cyclic order. For example, a partition number can be assigned using a modulo operation in which the partition number is based on a subset of physical address of the virtual memory page modulo the number of partitions with appropriate scaling, as described below in more detail. In one embodiment a row-column-bank address is determined by taking a select set of physical address bits divided by the number of partitions.

Figure 5:
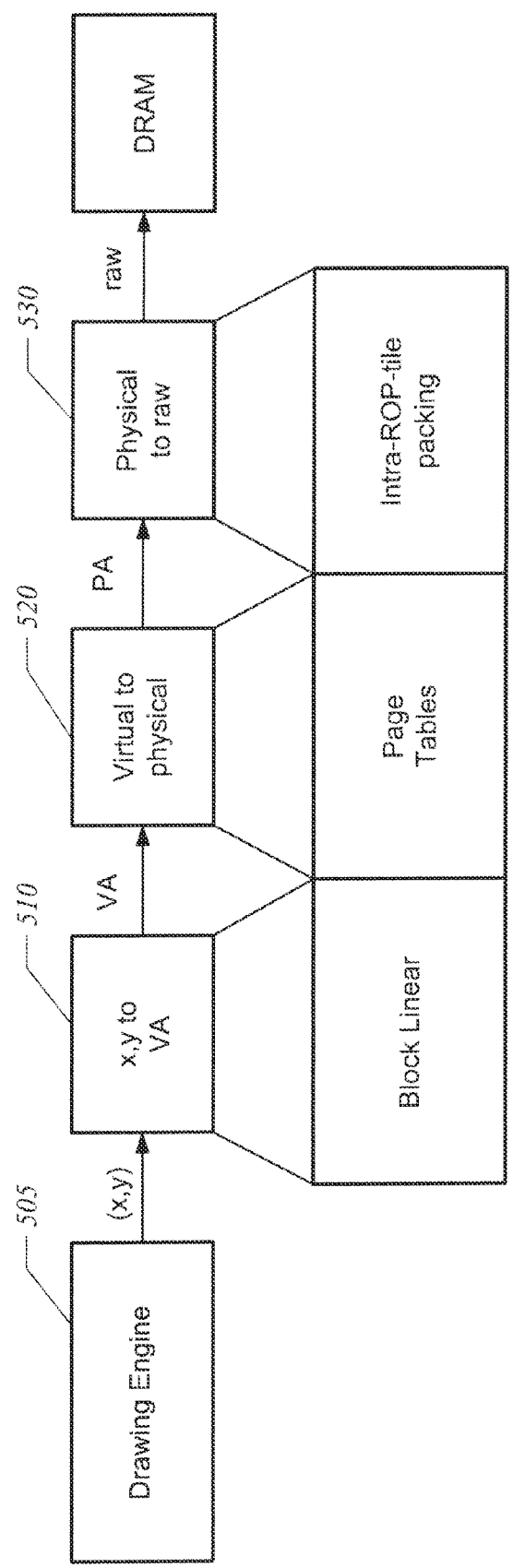
FIG. 5 illustrates an exemplary sequence of address translations according to one embodiment of the present invention.

FIG. 5 illustrates in more detail an exemplary sequence of address translation operations. A region of a graphics surface is generated by a drawing engine 505 and has (x, y, z) coordinates (for the case that graphics surface region is a two dimensional surface, it has (x, y) coordinates). A first address translation 510 is performed to map the graphics surface region to a one-dimensional virtual address (VA) space. The first address translation may comprise a conventional pitch memory format. However, as described in U.S. pat. Ser. No. 11/393,621, first address translation 510 may alternatively comprise a block-linear format to generate virtual addresses, which is described below in more detail. A second address translation 520 is performed to translate the virtual address to a physical address (PA). For example, upper bits of the virtual address may be used to lookup a page number and lower bits may be used to form the physical address, where the physical address is a unique number for each byte in memory. A third address translation 530 generates a raw address from the physical address. The raw address includes the collection of fields needed to uniquely locate each byte in the DRAMs. In particular, the raw address includes a partition number (and also sub-partition number, if a sub-partition is included) and a row-bank-column (RBC addresses) within a particular DRAM. The third translation 530 to determine the raw address may, for example, utilize information in a page table entry specifying a data "kind" describing one or more formats for packing tile data (e.g., intra-tile packing). That is the page table entry provides auxiliary information describing the organization of raw graphics data in memory. As examples, a PTE may comprise fields indicating a compression mode, a multi-sample format, and one or more tile data formats. As described below in more detail, in one embodiment a PTE may also include fields to support utilization of non-power of two numbers of DRAMs. such as a partition stride field to indicate units of contiguous memory stored within each partition, a partition offset field to adjust the partition number for the start of a page, and a bank swizzle field to perform bank swizzling for non-power of two numbers of DRAMs. It will also be understood that it is contemplated that more generally PTE fields may be provided to provide other types of information useful for performing address translation to optimize the use of a partitioned memory having a non-power of two number of DRAMs.

Figure 6:
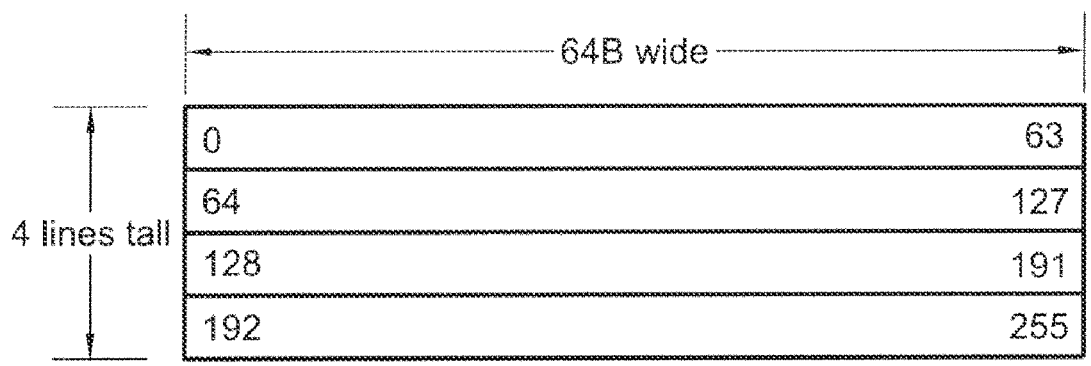
FIG. 6 illustrates an exemplary gob of a block-linear memory format in accordance with one embodiment of the present invention.
Figure 7:
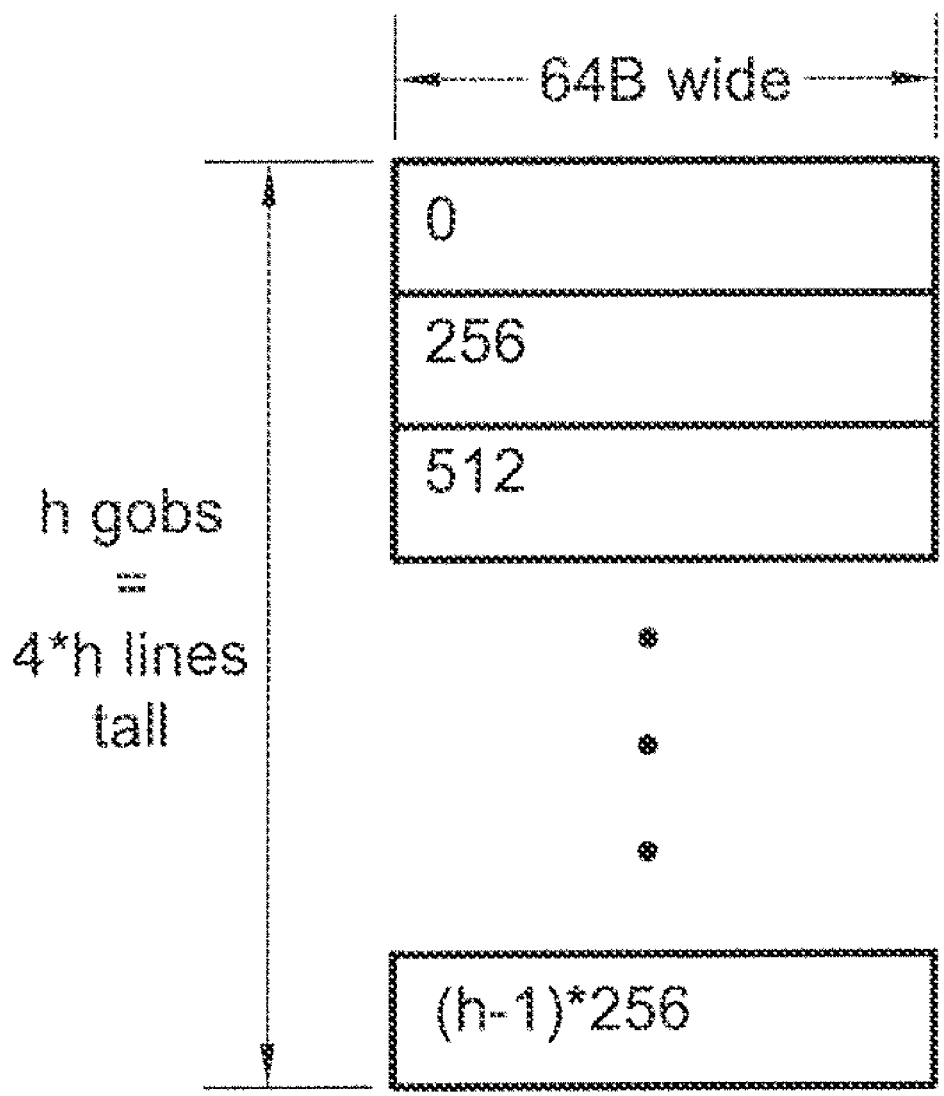
FIG. 7 illustrates an exemplary block of a block-linear memory format in accordance with one embodiment of the present invention.
Figure 8:
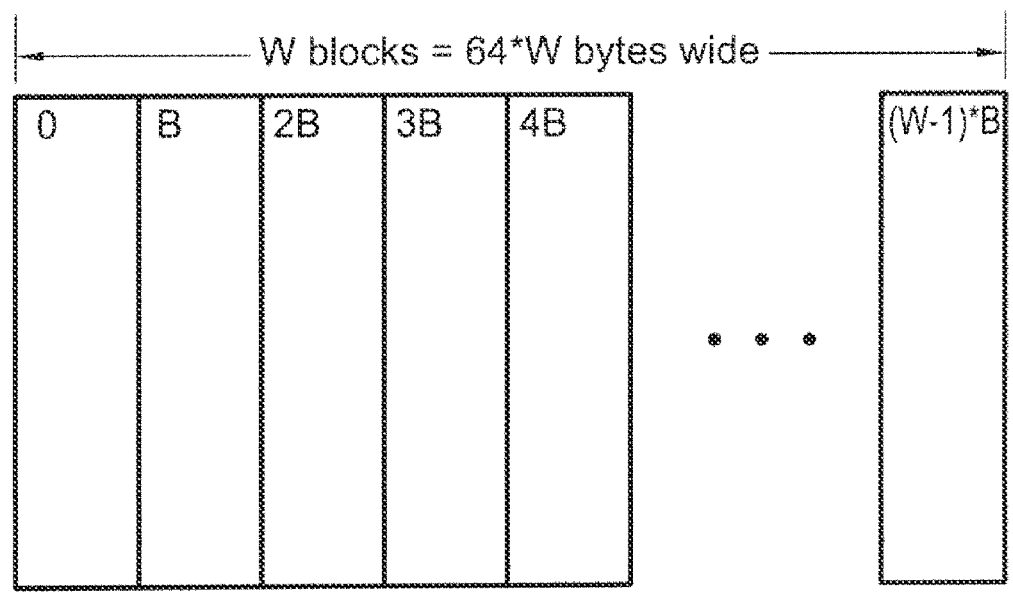
FIG. 8 illustrates an exemplary row of a block-linear memory format in accordance with one embodiment of the present invention.
Figure 9:
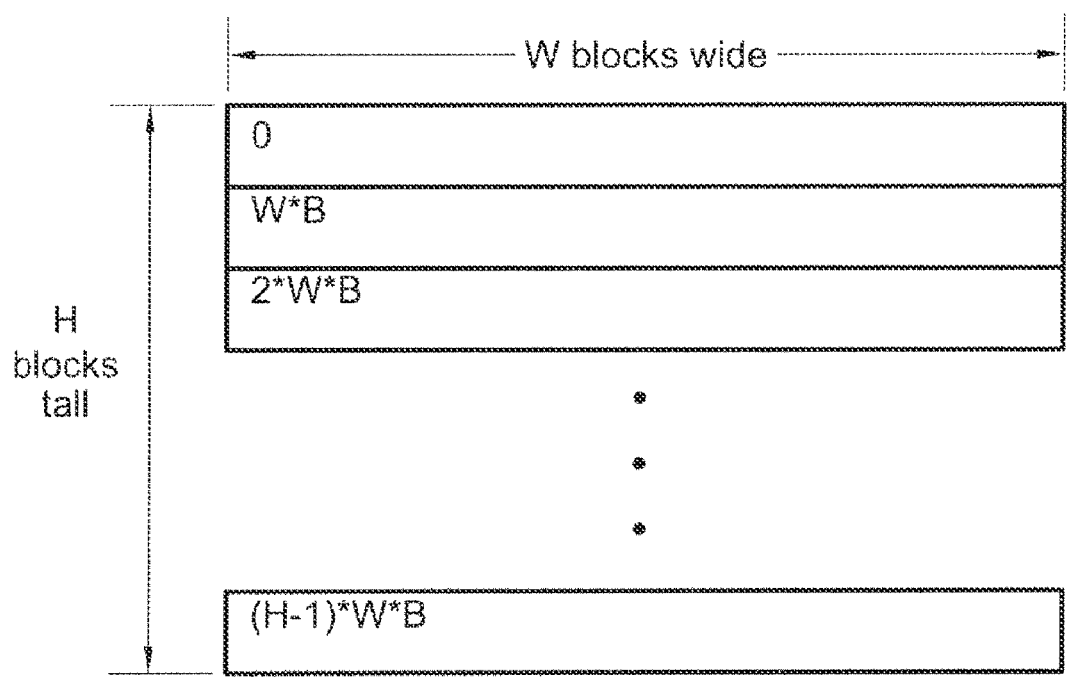
FIG. 9 illustrates a mapping of a surface in a block-linear memory format in accordance with one embodiment of the present invention.
Figure 10:
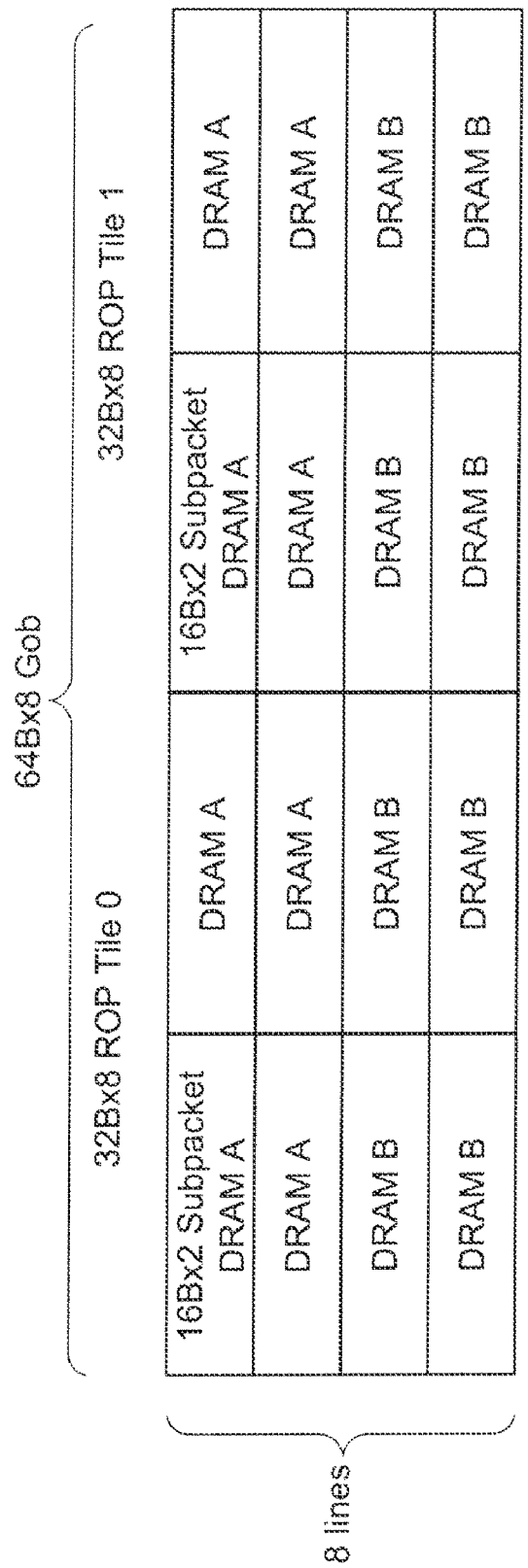
FIG. 10 illustrates an exemplary gob in accordance with one embodiment of a block-linear memory format.

In one embodiment of a block-linear memory format a graphics surface is mapped according to a hierarchical sequence of nested loops of gobs (sub-blocks), blocks, rows of blocks, and a whole surface to perform the mapping between spatial coordinates to virtual addresses. The gob is a selected number of lines tall (e.g., 4 or 8, depending on the implementation) and has a selected byte width (e.g., 64 B) A gob also preferably corresponds to an integer number of DRAM atoms for accessing an individual DRAM. A packing choice may be specified by a page kind field in a page table entry. As illustrated in FIG. 6, a gob corresponds to a rectangular region of memory, such as 256 bytes in virtual address space, which is a minimum unit of allocation of a block-linear surface in virtual address space. An individual gob may also correspond in size to that of a tile or small number of tiles. If a pixel requires 4 B of storage, a 256 B gob represents a 16 by 4 pixel region of a 2D surface. A gob is preferably 256 bytes aligned to 256B such that a gob never crosses a MMU page boundary. As illustrated in FIG. 7, a set of gobs are organized into a block. In particular, in one embodiment after the byte addresses of one gob are traversed the next gob down the block is traversed and so on until the block has been completely traversed. Blocks are further arranged in a specified order into rows, as illustrated in FIG. 8. Thus, after one block is traversed the next block is traversed in the row. Finally, as illustrated in FIG. 9, a whole surface is traversed through a sequence of rows. As previously described, a gob typically corresponds to one or more tiles and may be implemented with different numbers of lines. FIG. 10 illustrates a 64B×8 line Gob corresponding to two tiles. Individual sub-sections of a Gob may be assigned to different sub-partitions A or B.

The block-linear memory format maps graphics surfaces in a way that preserves attributes of the source data and which facilitates efficient access of data. In a block-linear format the block attributes may be selected to facilitate utilizing a non-power number of two DRAMs. As previously described in one embodiment virtual memory pages may be a power of two size or a non power of two size. In one embodiment the block height is always a power of two (e.g., $2^0$, $2^1$, $2^2$, $2^4$) number of gobs but the block width can be an integer number of gobs (e.g., 1, 2 or 3), In this implementation the virtual memory page width varies with the number of partitions.

As previously described, PTE fields may be included to provide information for a MMU to determine a partition number. One example of a PTE is a partition stride. The partition stride is a unit of contiguous virtual/physical memory contained within an individual partition. The partition stride determines how frequently the partition number is stepped as gobs are traversed. For example, the partition stride may correspond to one gob (256B) or a small number of gobs (e.g., four gobs or 1024B). Thus, individual gob-sized regions of contiguous virtual/physical memory addresses are mapped to individual partitions. A consequence of the partition stride is that gobs are interleaved amongst the partitions based, in part, on the partition stride. Additionally, as previously described a PTE may be included for a partition offset. The partition offset is a pre-computed partition number for the location at the start of the page in physical memory. Thus, the partition offset determines a starting partition for determining a partition number.

As previously described, MMU logic may use PTE information to determine a partition number based on a modulo operation. For example, with 1024B partitions an exemplary formula for mapping a physical address to a partition number (e.g., Partition [2:0], indicating a partition number) based on a modulo operation on upper bits of the address with respect to the number of partitions is as follows:
Partition[2:0]=(Physical Address[n-1:0])/(Partition Stride)) % (# partitions)

With a partition stride defined to be 256B or 1024B in a 64 KB virtual memory page, the equation simplifies to:
256B Partitions: Partition[2:0]=({Physical Address[n-1:8]}) % (# partitions)
1024B Partitions: Partition[2:0]=(Physical Address[n-1:10]) % (# partitions)

Where the modulo operation is performed with respect to a subset of the physical address bits and scaled appropriately by the partition stride to determine a partition number, which may correspond to bits specifying the partition number.

As previously described, row-column-bank addresses may be determined by MMU logic by analyzing a quotient of selected physical bits with respect to the number of partitions. In one implementation the nomenclature bank[b-1:0] denotes DRAM internal bank address bits and extbank denotes banks of DRAM chips. The RBC address (RBC_ADR) at the partition can be expressed by the following equations by examining a quotient of a set of physical address bits divided by the number of partitions. In the equations, the first expression is a concatenation of row bits, external bank "extbank" bits (corresponding to DRAMs operated in parallel), and internal bank bits and column "col" bits:
256B partition:
{row[r-1:0], extbank, bank[b-1:0], col[c-1:5]}=int(PA[n-1:8]}/partitions))//==RBC_ADR at partition
1024B partition:
{row[r-1:0], extbank, bank[b-1:0], col[c-1:5]}=if (problem page crossing region)
then
int(PA[n-1:8]/(# partitions))//==RBC_ADR
else
{int(PA[n-1:10]/(# partitions)), PA[9:8]}//==RBC_ADR The partition mapping is also preferably selected to support an arbitrary number of partitions such that the GPU can be used with graphics memory having a power of two number of partitions and also a non power of two number of partitions. A potential problem is achieving effective load balancing, particularly for power-of-two numbers of partitions. In the most straightforward implementation of a block linear format, gobs are organized vertically into column-like blocks before stepping horizontally. Note that as described below in more detail, an interleave between partitions vertically inside a virtual memory page mapping may be performed such that no adjacent gobs have the same number vertically. However, a problem that is encountered if a block has a power of two number of gobs (e.g., four gobs) and there are a power-of-two number of partitions, rows of gobs will be assigned to the same partition number. This is undesirable for the case of clients that access data in horizontal patterns since only one partition would be utilized, reducing memory access efficiency. In particular, it is generally desirable for common memory access patterns that the desired data be spread amongst the partitions so that the data can be efficiently accessed from multiple partitions in a minimum number of clock cycles.

In one embodiment an additional partition swizzling operation is performed to improve the assignment of partitions. In particular, the swizzling operation may be used to improve the abutment of gobs on virtual memory pages, particularly for the case of a power of two number of partitions. FIG. 11 illustrates an alignment of gobs on a virtual memory page that would occur without swizzling for the case of four partitions (0, 1, 2, and 3). The partition number associated with each gob is illustrated. Since there is a power of two number of partitions, entire rows of gobs are assigned to the same partition number. As previously described this in undesirable for clients that access data in horizontal patterns.

A hash operation may be used to swizzle the partition assignments to achieve a better pattern of gobs. FIG. 12 illustrates an alignment of gobs on a virtual memory page with swizzling to achieve a checkerboard pattern of gob partition assignments.

In one embodiment, a swizzling operation may utilize an XOR operation on selected address bits of page, such as on bits 0 to bit 15 of the 16 bits of a 64 KB page. These sixteen bits correspond to a region of contiguous addresses within one virtual memory page. That is, the swizzling is performed to reorganize particular virtual memory pages to improve abutment. The swizzling may also use the partition offset PTE to assist in determining a useful abutment. The swizzling will also depend upon the number of partitions used. The equations below describe an exemplary set of swizzling operations to interleave 256 B partitions depending upon the number of partitions using XOR operation ($\wedge$) on the 16 physical address (PA) bits 0 to 15 associated with a virtual memory page:

1 Partition:
Partition[2:0]=0
2 Partitions:
Partition[2:0]={0, 0, PA[8]$\wedge$PA[9]$\wedge$PA[10]$\wedge$PA[11]$\wedge$PA[12]$\wedge$PA[13]}
3 Partitions:
Partition[2:0]=(PA[15:8]+(Partition Offset)) % 3
4 Partitions:
Partition[2:0]=(PA[14]+PA[13:12]+PA[11:10]+PA[9:8]) % 4
5 Partitions:
Partition[2:0]=(PA[15:8]+(Partition Offset)) % 5
6 Partitions:
Partition[2:0] ((PA[15:8]+(Partition Offset)) % 6)$\wedge$\{0, 0, swz [4]$\wedge$swz [3]$\wedge$swz [2]$\wedge$swz [1]$\wedge$swz [0]\}
where swz[4:0]=int(PA[n-1:8]/6)%32

As previously described, in one embodiment a PTE field may be included for bank swizzling. Bank swizzling of the physical bank bits permits the banks to be optimally aligned to prevent DRAM page faults. For example, consider a 4 bank pattern and an 8 bank pattern.

Without bank swizzling, the bank patterns are as follows:
4 bank pattern: 0 1 2 3
8 bank pattern: 0 1 2 3 4 5 6 7

Since a bank may span all partitions, partition swizzling may not solve the same bank abutment problem. Systems with power-of-two number of partitions will have mapping patterns similar to those illustrated in FIG. 11.

With bank swizzling, the bank patterns are swizzled. Exemplary swizzled 4 bank and 8 bank patterns are as follows:
4 bank pattern (swizzled): 2 1 3 0
8 bank pattern (swizzled): 4 6 1 3 5 7 0 2

As previously described in regards to FIG. 3, in one embodiment each partition includes a non-power of two number of DRAMs, such as three DRAMs. A modulo technique may be used to map physical addresses to a non-power of two number of sub-partitions. For example with three DRAM sub-partitions each having a 16B access for a 48B total, a first modulo operation may be used to take the physical address for the partition modulo by 48 B and then the result divided by 48 B to select the partition. Within the 48 B of the selected partition, a second modulo operation, a modulo three, would determine the DRAM sub-partition. The RBC address within the sub-partition is then determined by dividing the physical address by 48 B.

Figure 13:
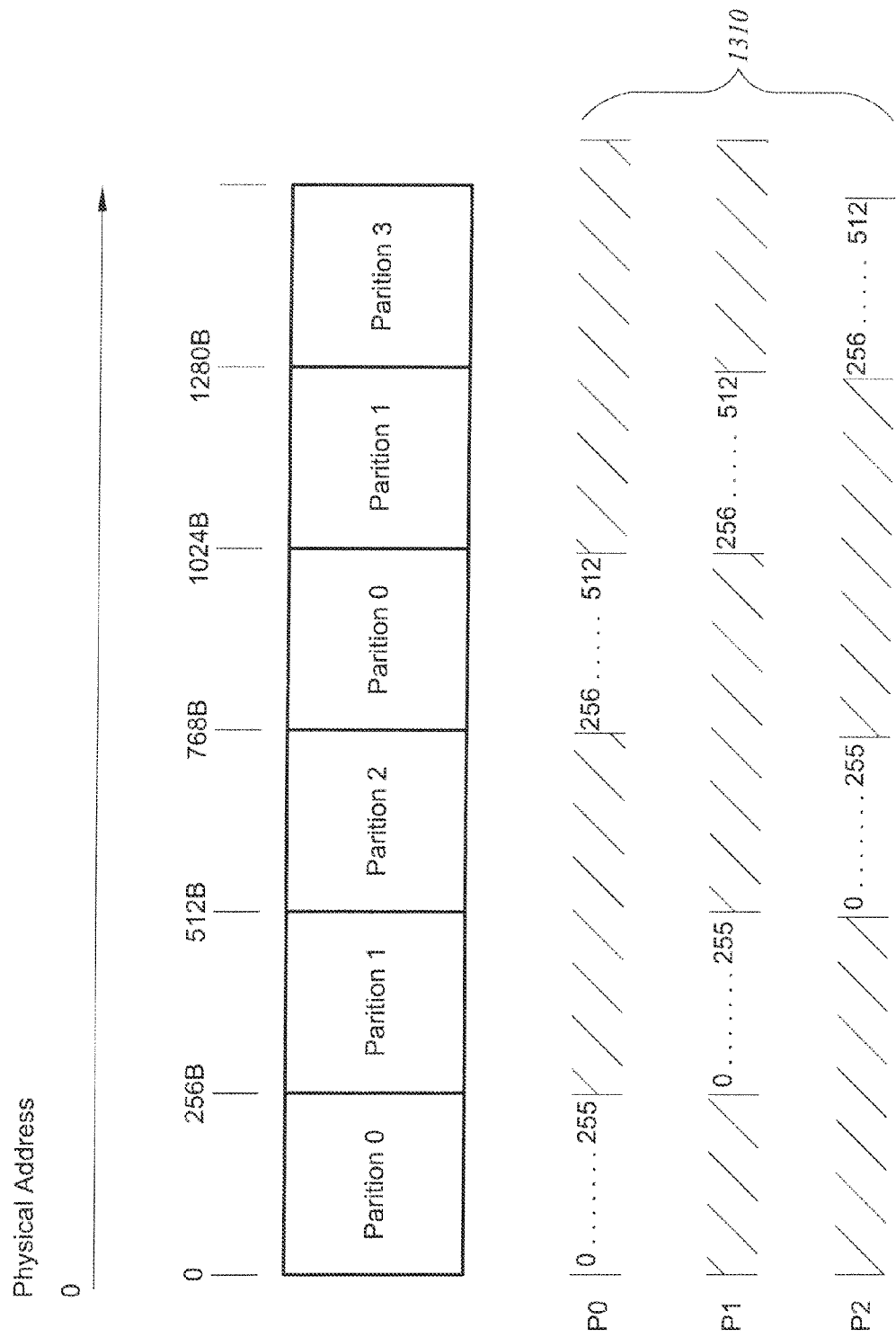
FIG. 13 illustrates an exemplary mapping of physical addresses to partition numbers and row-column-bank addresses.

FIG. 13 illustrates some of the aspects of determining partition numbers and RBC addresses. The physical address space progresses from zero to some upper number. In this example, the mapping of physical addresses to partition numbers P0, P1, and P2 is based on a partition stride of 256B. As indicated in inset 1310, the address translation between physical addresses and raw DRAM addresses has to account for the fact that physical addresses are assigned to the partitions in a sequence, i.e. partition 0 (P0) receives bytes 0 to 255 for one range of physical addresses and then bytes 256 to 512 for a separate range of physical addresses. Additionally, the address translation will depend upon which partition is selected to be the first partition of a page (in this example, partition P0). The partition offset or starting partition may be calculated or stored in the PTE. It can be understood from FIG. 13 that a modulo operation based on the number of partitions, a partition stride, and a partition offset is an efficient way to translate physical addresses to partition number. However, it will be understood that other address translation methods are also contemplated to determine partition number and RBC addresses.

Figure 14:
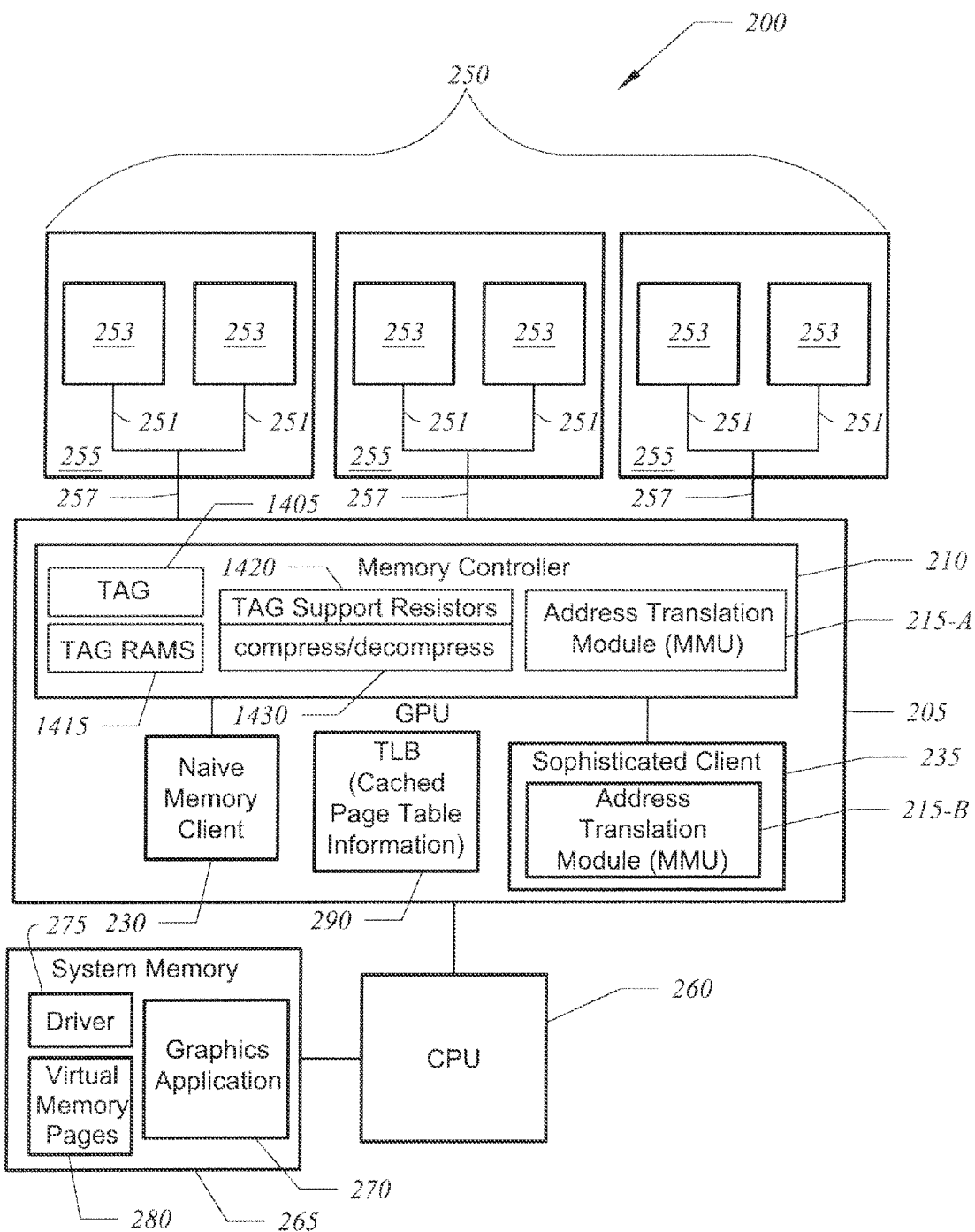
FIG. 14 illustrates a graphic system virtual memory and with tag addressing in accordance with one embodiment of the present invention.

Referring to FIG. 14, in one embodiment graphics system 200 has a tag module 1405 maps the compression status of tiles utilizing compression tags. A compression/decompression module 1430 supports compressing/decompressing tile data. Generally speaking, a tile may be incompressible or compressible. If a tile is compressible, there may be one or more compression options. Compressed tiles may require different handling than uncompressed tiles. As one example, the compression status of a tile is important in read-modify-write operations in which if a tile is compressed, it must first be uncompressed before the tile is modified with a partial write. Compression tags provide a means to map the compression status of tiles. The individual compression tags may be implemented with a small number of bits to indicate whether a tile is uncompressed or compressed. if more than one compression format is supported, the compression tags may also indicate which of a plurality of compression formats are used. The use of compression tags is described in several pending patent applications by the Nvidia Corporation of Santa Clara, Calif. such as U.S. Provisional Patent Application No. 60/813,811, filed on Jun. 14, 2006 and U.S. Provisional Patent Application No. 60/813,803, filed on Jun. 14, 2006, which describes performing read-modify-write operation of tile data in a multi-banked DRAM memory, such as a frame buffer memory. A compression bit detector may be used to read compression tags associated with memory tiles. If the compression tag has a pre-selected bit value indicating that the tile data is compressible, the compression tag may be used to trigger read-modify write operations requiring decompression of tile data. The contents of U.S. Provisional Patent Application No. 60/813,811 and filed on Jun. 14, 2006 and U.S. Provisional Patent Application No. 60/813,803, filed on Jun. 14, 2006 are hereby incorporated by reference.

In one embodiment, a set of Tag RAMs 1415 is provide and each partition has a tag RAM to store compress bits. That is, there is one tag RAM per partition. As an illustrative example, an individual tag RAM may have a fixed width of 32 bits with the tag RAM residing at a level below that of the arbitration logic used to assign requests to individual partitions. The Tag RAMs may, for example, be implemented as multi-banked pseudo multi-ported Tag RAM having an associated tag bit prefetch mechanism. For the purposes of illustration, the Tag RAMs 1415 are illustrated as being within memory controller 210 although more generally, they may be disposed in other locations but the preferred level is below the level of the arbitration logic used to assign requests to individual partitions. The Tag RAMs 1415 need to be addressed to lookup the tags associated with tiles. In one embodiment, tiles are either single-bit compressible or double-bit tag compressible. Additionally, as described below in more detail, tag support registers 1420 are preferably provided to store information for hardware to perform address translation.

In a graphics system utilizing virtual memory pages 280, PTE fields may be used to store information to perform address translation to Tag RAM addresses. In a virtual memory implementation, software may use the PTEs to provide a view into hardware tag addresses related to storing information on tile compression status. In particular a PTE kind=tag kind in virtual memory provides information to lookup a tag RAM address in tag RAMs 141 Thus, any time software performs a memory access, it can use the PTEs to look into tag rams 1415.

One issue associated with graphics system 200 is efficiently utilizing virtual memory and tag addressing for the case in which there are an arbitrary number of partitions which can include non-power of two numbers of partitions. In a partitioned graphics system, physical addresses are mapped to partitions according to rules that, for example, interleave tiles amongst the partitions. For example, as previously described, an equation that may be used to map a physical address (PA) to a partition is:

partition=PA[n-1:8]% # of partitions.

The address within a partition may be determined using the equation:

address within partition=int(PA[n-1:8]/# of partitions)+PA[7:0].

As previously described, in a partitioned graphics memory an interleave stride is defined in terms of the number of tiles that are stored in each partition occurrence before moving on to the next partition in the interleave sequence. For example, in one embodiment a compressible tile is 128B, and the partition interleave is 256B. Therefore in this example two 128B compress tiles are in each partition occurrence.

A problem arises when virtual memory is used for tag RAM address mapping and the graphics system has an arbitrary number of partitions that may include both a power of two and a non-power of two number of partitions. If there were only a power of two number of partitions, an efficient mapping can be made from virtual memory pages (having power of two sizes, such as 64 KB) to tag RAM address boundaries. However, the boundaries of 64 KB virtual memory pages do not inherently fall on power of address boundaries in the tag RAMs when the number of partitions is not equal to a power of two. Additionally, there are problems associated with tag caches used by other units in the graphics system, such as a raster operations (ROP) unit (not shown). In a graphics system with a variable number of partitions (e.g., one to six partitions) there are also no good common multiples for tag RAM width or cache line width. Thus in a nave implementation there are problems associated with trying to force 64 KB addresses on the tag RAM (or cache line) boundaries when there a variable number of partitions that can include a non-power of two number of partitions. Additionally, in a nave implementation software may have problems with tag RAM allocation for various partition configurations. It is therefore desirable to have a virtual memory implementation that accommodates variable numbers of partitions and which is comparatively simple to implement, wastes little tag RAM storage, does not require RAMs with data widths that are multiples of the relative primes of all the partition numbers supported, and exposes a comparatively simple TAG RAM allocation model to software that is independent of the number of partitions in the system.

With a non-power of two number of partitions, a given partition may map to more memory in that physical page than other partitions. Therefore, that partition will require more tag RAM storage. The partitions are interleaved and appear multiple times within the 64 KB physical page. Thus for example, with a non-power of two number of partitions, partition 0 may appear more times than partition 1. Note that since the tag RAMs reside in the partitions, fewer or disabled partitions results in less tag RAM available.

Consider as an illustrative example a graphics system having virtual memory with 64 KB virtual memory pages. Each tile may, for example, correspond to a size of 128 Bytes (e.g., 32 Bytes×4 lines) and that both one bit compression and two bit compression tags may be supported. A 64 KB memory page corresponds to a data size of 512 such 128 B tiles. Thus, for the case of 64 KB virtual memory pages, 128 B tiles, and one bit compression tags there will be 512 tag bits whereas for 64 KB virtual memory pages, 128 B tiles, and two bit compression tags there will be 1024 tag bits. If the tiles are interleaved amongst the partitions, an even interleaving is not possible if there is a non-power of two number of partitions. For example, with two partitions (two to the first power) 256 tiles can be allocated to each partition, i.e., an even interleaving. However, with three partitions, the allocation of whole tiles to partitions is not perfectly uniform since fractional tile allocations are not permitted (i.e., 512/3 is approximately 170.7 but fractional tile allocations are not permitted). The allocation will thus be uneven (i.e., at least 170, 171, and 171). However, the maximum number of tag bits per partition may be rounded up slightly higher to allow the multiply to be implemented with a smaller number of adds (e.g., 172, 170, and 170). This maximum number of tag bits per partition is defined as the hardware partition stride. For example, 512 whole tiles could be allocated with 171 tiles to one partition, 171 tiles to the second partition, and 170 tiles to the third partition. As described below in more detail, in one embodiment, a software stride factor at least takes into account decreases in maximum tag addresses necessitated by the hardware partition stride. That is, the software stride factor takes into account a scaling required by changes made to the hardware stride when a non-power of two number of partitions are used instead of a power of two number of partitions. In one implementation, the software partition stride is 1.0 for a power of two number of partitions and 65/64 for a non-power of two number of partitions.

In one embodiment, all tag RAMs assigned to each of the partitions receive the same tag address for a given virtual address. In this embodiment, a virtual memory page represents all of the tag bits spread across the partitions (e.g., 512 or 1024 tag bits for a 64 KB virtual memory page and one or two bit compression tags). To simplify addressing, an allocation of tag bits can be made that is the size of the maximum number of tag bits across all partitions (i.e., rounding up), even though not all partitions will use the same number of tag bits in the virtual memory page.

Figure 15:
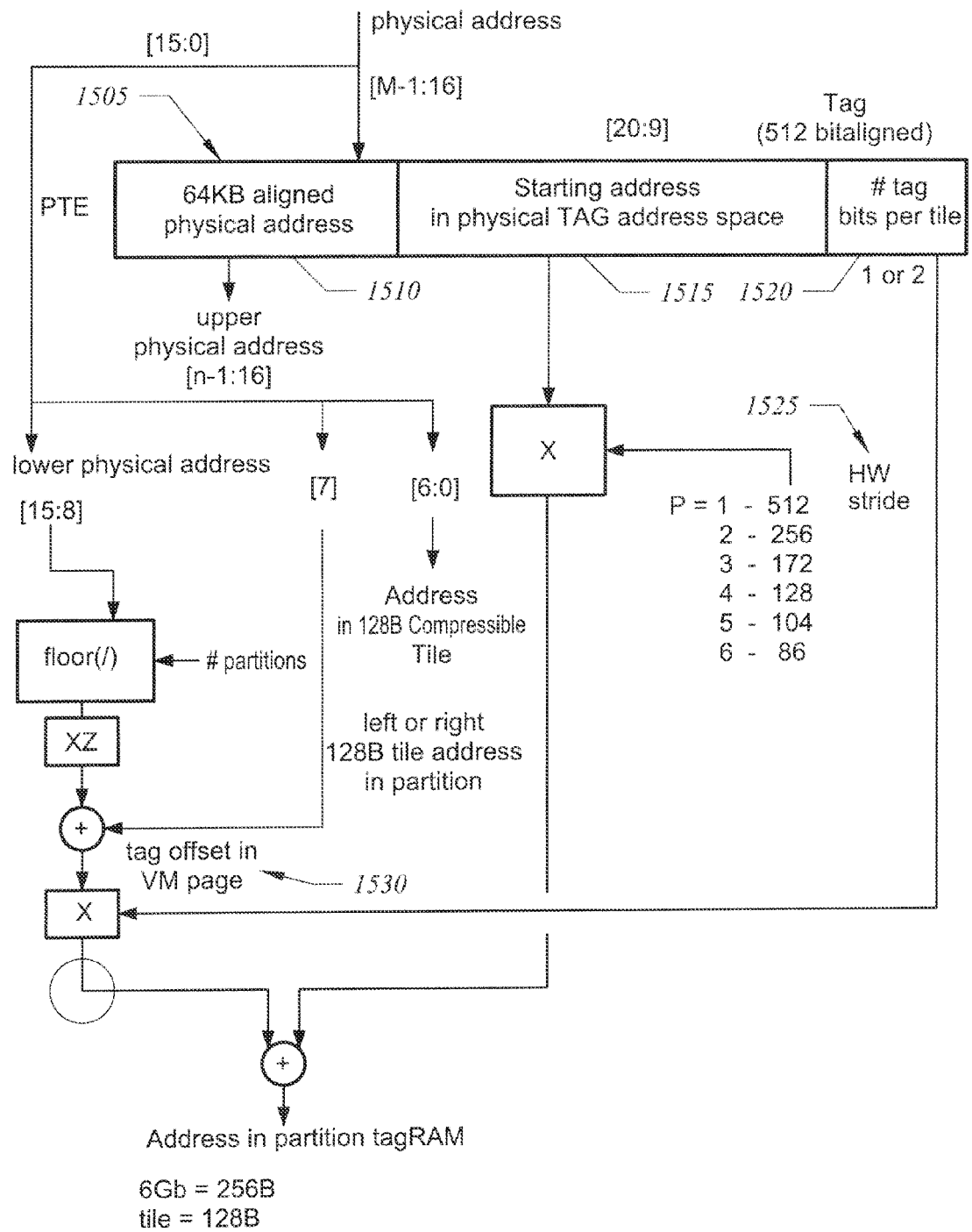
FIG. 15 illustrates tag addressing using page table entries in accordance with one embodiment of the present invention.

Referring to FIG. 15, in one embodiment, a Page Table Entry (PTE) 1505 holds the translated 64 KB aligned physical address 1510, the starting physical address of the tag RAM of the 64 KB page as viewed by software 1515 corresponding to a tag offset in the virtual memory page (e.g., 512 bit aligned), and a field indicating the number of tag bits per tile 1520 used for the compression scheme used to compress the tile (e.g. 1 or 2 bit compression). An address in tag RAM may be determined from the PTE entry 1501, a hardware stride factor table 1525 and a tag offset into a virtual memory page 1530 which is described below in more detail. The virtual memory software maps blocks of bits into the tag RAM, with the size of a block depending on whether the PTE kind bits say the surface is compressible and whether 1 or 2 bit compression is used. In one embodiment for 128 Byte tiles, software maps 512 tag bit blocks for one bit compression and 1024 tag bit blocks for 2 bit compression. In one embodiment a selected number of PTE tag address bits (e.g., twelve bits [20:9]) are allowed for storing start locations of pages (e.g., 64 KB blocks) in tag RAM. In this embodiment, software maps 512 or 1024 bit clocks in the tag RAM depending upon whether PTE kind bits say the surface is compressible and whether a 128 Byte tile uses 1 or 2 bits.

As an illustrative example, in one embodiment a software model of the tag storage is of a finite space with a maximum size given by hardware. The programmable address in the PTE has a 512 compress bit granularity. As previously discussed, recall that for a 64 KB virtual memory page and 128B tiles that there are 64 KB/128 B=512 tiles per physical page. If 1 compress bit per tile is used, then the 64 KB page uses 512 compress bits. However, if we use 2 compress bits/tile are used then the 64 KB page uses 1024 compress bits.

In one implementation, software does not have to be aware of the number of partitions in managing PTEs. In this embodiment, software only needs the maximum compress tag address to manage the allocation. In one implementation, a table is stored (e.g., in one or more hardware tag support registers 1420) having the maximum number of compress bits needed per partition for a 64 KB physical page. As previously described in regards to the hardware stride, the number of compress bits is rounded up to allow enough tag bits for the partition that is used the most times in the 64 KB page, The maximum number of compress bits per partition may also rounded up a little more to allow the multiply to have fewer adds, although this wastes a small percentage of the tag RAM storage. A software stride factor takes the hardware partition stride into account when calculating the total compress storage available. The software stride factor, for example, permits the upper tag address to be divided by the software stride factor to compensate for the extra tag storage wasted for the non-power of two partition configuration cases. This multiple (e.g., 65/64 for one implementation of non-power of two partitions) is used to determine maximum compress tag storage for all non-power of two partition cases for simplicity. The maximum tags available needs to only be calculated once and reused for comparison when determining tag availability during tag allocation. For example, for the three partition case where 512 tag bits are distributed across three partitions the hardware partition stride is 172 and a software allocation stride factor for determining maximum tag address is 65/64. Since the by 172 multiply can be performed in hardware, software does not have to have any knowledge of the skipped bits.

Table 1 shows bits needed for 1 compress bit/tile assuming 64 KB pages and 128 B tiles such that there are 512 tiles per page. SW allocates 512 tag bits when one compress bit per tile is used. SW will allocate 1024 tag bits when two compress bits per tile are used. For the case that there are a power of two number of partitions the 512 tiles can be evenly allocated across the partitions. The number of tag bits consumed per partition in a physical page is roughly 512 or 1024 bits/# partitions. However, the number of tag bits for a non-power of two number of partitions (e.g., three, five, or six partitions) is rounded up slightly as previously described to account for non-uniform allocation of tiles and to facilitate computations. That is, software increases the allocation of bits for a maximum software address, slightly, for non-power of two numbers of partitions. Table 2 illustrates another example for two compress bits per tile and having 1024 tag bits which are scaled by the software allocation stride factor.

TABLE 1

Example for single tag bit compression KIND

| # partitions | 64 KB tag bits per partition | SW allocation stride factor | SW 64 KB allocation size (bits) | HW partition stride single (bits) |
|---|---|---|---|---|
| 1 | 512 | 1 | 512 * 1 | 512 |
| 2 | 256 | 1 | 512 * 1 | 256 |
| 3 | 172 | 65/64 | 512 * 65/64 | 172 |
| 4 | 128 | 1 | 512 * 1 | 128 |
| 5 | 104 | 65/64 | 512 * 65/64 | 104 |
| 6 | 86 | 65/64 | 512 * 65/64 | 86 |

TABLE 2

Example for double tag bit compression KIND

| # partitions | 64 KB tag bits per partition | SW allocation stride factor | SW 64 KB allocation size (bits) | HW partition stride double (bits) |
|---|---|---|---|---|
| 1 | 1024 | 1 | 1024 * 1 | 1024 |
| 2 | 512 | 1 | 1024 * 1 | 512 |
| 3 | 344 | 65/64 | 1024 * 65/64 | 344 |
| 4 | 256 | 1 | 1024 * 1 | 256 |
| 5 | 208 | 65/64 | 1024 * 65/64 | 208 |
| 6 | 172 | 65/64 | 1024 * 65/64 | 172 |

Referring back to FIG. 15 in one embodiment a PTE may be used to store start locations of the 64 KB blocks in tag RAM. In one embodiment the Tag RAM PTE bits represent an effective twelve bit tag [20:9] address in the tag RAM across all of the partitions. The Tag RAM may have a fixed assignment of bits for each partition. In one embodiment, the lower nine bits of a software tag address correspond to the 512 bit blocks. The remaining upper 12 bits of the software tag address indicate the start address of the blocks. For example, in one embodiment a SW tag address[20:9]=512 bit aligned start address of 64 KB page in software's view of tag space. That is the SW tag address [20:9] is a 512 bit offset of a 64 KB virtual memory page in tag RAM. In one embodiment software can read a register that stores the software stride factor. The hardware stride factor and the number of partitions may also be stored in registers. The maximum software tag address can be determined from the maximum number of tag bits per partition, the number of partitions, and the software allocation stride factor as follows:

Max SW tag address[20:9]=(size of tag RAM per partition in bits)*(# active partitions)/(SW allocation stride factor*512).

In hardware, the tag address is independent of which partition it is received. The amount of tag bits consumed per partition in a physical page is roughly 512 or 1024 bits/# partitions. The hardware tag address can be calculated from the PTE tag address, the hardware partition stride, and the number of partitions using the following equation:

HW tag address[20:0]=PTE_tag[20:9]*HW partition stride+(2 or 4)*int(PA[15:8]/# partitions)

where int is the floor function and a 2 or a four is used, respectively for single and double bit compression and to account for addressing tags by gobs having two tiles. Note that the hardware partition stride corresponds to an offset into Tag RAM and the int ("integer") function corresponds to an offset from the start of the virtual memory page into tag RAM based on the virtual memory format for gobs.

The present invention provides several benefits. The present invention provides a comparatively simple way to handle tag addressing for non-power of two number of partitions. The management that software must perform is also comparatively straightforward. The address that software manages in page table entries does not depend on the number of partitions. For example, in one embodiment software looks at the offset (e.g., 512 bit blocks) and for allocation purposes can perform a read of registers and then perform a multiply to obtain the maximum software tag address to determine if physical tag resources are available at that tag address. Hardware performs a multiply from table 1525 to the 64 KB tag starting address to determine the tag starting address in the hardware storage. Thus, in one embodiment to software, 64 KB VM pages use either 512 or 1024 bits of tag RAM because the allocation factor multiply operation is done in hardware. Note that while addressing is simplified, it comes at a slight cost in that the tag RAM wastes a few bits in the virtual memory page to simplify addressing. Another benefit is that width of the tag RAM is also not dependent on the number of partitions, e.g., a virtual memory pages can straddle lines in the tag RAM. The present invention permits virtual memory pages (e.g., 64 KB pages) to have compression tags mapped to an arbitrary number of partitions.

Another benefit of the present invention is that since that tag RAM addresses are the same in each partition, it eliminates some of the disadvantages that would arise if separate tag RAM addresses were required for each partition, such as the need for replacement pools of tag RAM pages that depend on which partition the physical page starts on.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics system, comprising:
   a partitioned tiled graphics memory having a plurality of partitions each including at least one dynamic random access memory (DRAM);
   a graphics processing unit including an address translation module to translate virtual addresses into physical addresses, said address translation module operative to map a physical memory address to a partition number; and
   a tag RAM assigned to each partition storing compression tags indicative of a compression status associated with tiles stored in said partitioned graphics memory;
   a virtual memory in which page table entries are used to store information for mapping page table entries to tag RAM addresses including a bit aligned starting offset address of memory pages in a software representation of tag address space, said page table entries' supporting both a power-of-two and a non-power of two number of partitions;
   wherein said page table entries utilizes a common software tag RAM address mapping for all partitions.

2. The graphics system of claim 1, wherein said page table entries include a translated aligned physical address, a starting physical address of bit aligned blocks, and a compression mode.

3. The graphics system of claim 1, wherein said page table entries include a pre-selected number of bits used to represent a starting address of bit-aligned blocks in physical tag address space.

4. The graphics system of claim 3, wherein said page table entries include at least one compression mode bit per tile.

5. The graphics system of claim 1, wherein said graphics system determines a hardware partition stride based on the number of tiles per physical page and the number of compression bits per tile, wherein for a non-power of two number of partitions the hardware partition stride is selected to correspond to a maximum number of compression bits allocated to an individual partition to account for non-uniform interleaving of tiles.

6. The graphics system of claim 5, wherein said hardware partition stride is further rounded up to facilitate performing calculations based on the hardware partition stride.

7. The graphics system of claim 5, wherein a hardware tag address corresponds to a tag address of a page table entry field multiplied by said hardware partition stride further modified by a tag offset into virtual memory in tag RAM.

8. The graphics system of claim 5, wherein a maximum software tag address is the maximum number of compression bits per partition multiplied by the number of active partitions and scaled by a software allocation stride factor.

9. The graphics system of claim 8, wherein said maximum software tag address is calculated at an initial time in software and used for comparison at later time for allocating tag RAM.

10. The graphics system of claim 8, wherein for a non-power of two number of partitions said software allocation stride factor at least compensates for an increase in compression bits associated with said hardware partition stride.

11. The graphics system of claim 1, wherein said offset is a 512 bit offset of 64 KB virtual memory pages into a tag RAM address space.

12. The graphics system of claim 1, wherein a maximum software tag address is based on a hardware partition stride corresponding to a maximum number of tag bits per partition, and software allocation stride factor indicative of how a software allocation of tag bits is scaled for non-power-of two number of partitions to account for non-uniform tile interleaving.

13. The graphics system of claim 1, wherein software addresses are bit aligned with respect to a pre-selected bit block size.

14. A graphics system, comprising:
   a partitioned tiled graphics memory having a plurality of partitions each including at least one dynamic random access memory (DRAM);
   a graphics processing unit including an address translation module to translate virtual addresses into physical addresses, said address translation module operative to map a physical memory address to a partition number; and
   a tag RAM assigned to each partition storing compression tags indicative of a compression status associated with tiles stored in said partitioned graphics memory;
   a virtual memory in which page table entries are used to store information for mapping page table entries to tag RAM addresses including a hit aligned starting offset address of memory pages in a software representation of tag address space, said page table entries supporting both a power-of-two and a non-power of two number of partitions;

wherein each tag indicates whether a tile is one bit compressible or two-bit compressible.

15. The graphics system of claim 14, wherein said page table entries utilizes a common software tag RAM address mapping for all partitions.

16. The graphics system of claim 14 wherein said page table entries include a pre-selected number of hits used to represent a starting address of bit-aligned blocks in physical tag address space.

17. The graphics system of claim 14, wherein a maximum software tag address is based on a hardware partition stride corresponding to a maximum number of tag bits per partition, and software allocation stride factor indicative of how a software allocation of tag bits is scaled for non-power-of two number of partitions to account for non-uniform tile interleaving.

18. A graphics system utilizing virtual memory, comprising:

a central processing unit utilizing 64 KB virtual memory pages for address translation;

a partitioned graphics memory having a plurality of partitions each including at least one dynamic random access memory (DRAM);

a graphics processing unit coupled to said partitioned graphics memory;

an address translation module in said graphics processing unit performing an address translation mapping virtual addresses to physical addresses and determining individual partitions associated with memory accesses for individual units of virtual memory allocation;

said graphics system performing partition interleaving in which data for individual units of virtual memory allocation corresponding to tiles are assigned in an interleaved fashion to different partitions;

a tag RAM assigned to each partition storing compression tags indicative of a compression status associated with tiles stored in said partitioned graphics memory;

wherein page table entries are used to store information for mapping page table entries to tag RAM addresses including a bit aligned starting offset address of memory pages in a software representation of tag address space, said page table entries supporting both a power-of-two and a non-power of two number of partitions;

wherein for a non-power of two number of partitions said graphics system identifies a maximum number of tag bits per partition as a hardware partition stride and a software allocation of a maximum number of tag address bits is scaled by a software allocation stride factor with software addresses bit aligned with respected to a pre-selected bit block size to align 64 KB pages on tag RAM address boundaries.

19. The graphics system of claim 18, wherein said page table entries includes a translated aligned physical address, a starting physical address of bit aligned blocks, and a compression mode.

20. The graphics system of claim 18, wherein said page table entries utilizes a common software tag RAM address mapping for all partitions.

21. The graphics system of claim 18, wherein said graphics system determines a hardware partition stride based on the number of tiles per physical page and the number of compression bits per tile, wherein for a non-power of two number of partitions the partition stride is selected to correspond to a maximum number of compression bits allocated to an individual partition to account for non-uniform interleaving of tiles.

22. The graphics system of claim 18, wherein for virtual memory pages utilize a fixed number of tag bits per tag RAM and said scaling by said software allocation stride factor is performed using a multiplication in hardware.

* * * * *